United States Patent
Hirano

(10) Patent No.: US 11,639,144 B2
(45) Date of Patent: *May 2, 2023

(54) IN-VEHICLE NETWORK SYSTEM

(71) Applicant: TOYOTA JIDOSHA KABUSHIKI KAISHA, Toyota (JP)

(72) Inventor: Takahiro Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,009

(22) Filed: Nov. 4, 2021

(65) Prior Publication Data

US 2022/0055556 A1 Feb. 24, 2022

Related U.S. Application Data

(63) Continuation of application No. 16/862,627, filed on Apr. 30, 2020, now Pat. No. 11,208,061.

(30) Foreign Application Priority Data

Jul. 9, 2019 (JP) .............................. JP2019-127626

(51) Int. Cl.
*B60R 16/023* (2006.01)
*B60R 16/03* (2006.01)

(52) U.S. Cl.
CPC .......... *B60R 16/0231* (2013.01); *B60R 16/03* (2013.01)

(58) Field of Classification Search
CPC ........... H04L 12/10; H04L 2012/40273; H04L 12/12; H04L 12/40039; B60R 16/03; B60R 16/0231; Y02D 30/50
See application file for complete search history.

(56) References Cited

U.S. PATENT DOCUMENTS

| | | | |
|---|---|---|---|
| 11,208,061 B2 * | 12/2021 | Hirano | ................ B60R 16/0231 |
| 2011/0320081 A1 | 12/2011 | Ogura et al. | |
| 2013/0103959 A1 | 4/2013 | Hatta | |
| 2015/0112510 A1 | 4/2015 | Tokunaga et al. | |
| 2017/0126703 A1 | 5/2017 | Ujiie et al. | |
| 2019/0263279 A1 | 8/2019 | Kyojo et al. | |

FOREIGN PATENT DOCUMENTS

| | | |
|---|---|---|
| JP | 2015-081021 A | 4/2015 |
| JP | 2016-134855 A | 7/2016 |
| JP | 2018-103972 A | 7/2018 |

* cited by examiner

*Primary Examiner* — Jared Fureman
*Assistant Examiner* — Duc M Pham
(74) *Attorney, Agent, or Firm* — Oliff PLC

(57) ABSTRACT

An in-vehicle network system includes a power supply, an upper electronic control unit (ECU), an intermediate ECU configured to communicate with the upper ECU, and a plurality of lower ECUs configured to communicate with the intermediate ECU. The intermediate ECU is configured to receive power supplied from the power supply and supply the power supplied from the power supply to the lower ECUs. The lower ECUs are configured to transition, when the power is supplied from the intermediate ECU, from a power-off state to a standby state to wait for an instruction. The power supply is connected to the intermediate ECU via a power line and is not connected via the same power line to the upper ECU.

17 Claims, 3 Drawing Sheets

IN-VEHICLE NETWORK SYSTEM

INCORPORATION BY REFERENCE

This application is a Continuation of U.S. patent application Ser. No. 16/862,627 filed on Apr. 30, 2020, which claims the benefit of Japanese Patent Application No. 2019-127626 filed on Jul. 9, 2019, all of which are hereby incorporated by reference in their entirety.

BACKGROUND

1. Technical Field

The disclosure relates to an in-vehicle network system.

2. Description of Related Art

A vehicle is equipped with a plurality of in-vehicle devices each called an electronic control unit (ECU). One mode of operation control of the ECUs will be described with reference to FIGS. 3A and 3B. In the example shown in FIG. 3A, power from a power supply 900 is supplied to an ECU 902 as battery (+B) power of a +B power supply, accessory (ACC) power of an ACC power supply, and ignition (IG) power of an IG power supply via three power lines 905, 906, and 907, respectively. The power line 905 directly connects the power supply 900 and the ECU 902, and power is constantly supplied by the power line 905. The power line 906 connects the power supply 900 and the ECU 902 via an ACC relay 903. The power line 907 connects the power supply 900 and the ECU 902 via an IG relay 904. A power supply management ECU 901 detects a user's operation of turning on an ACC or an IG using a key or a push switch, and operates the ACC relay 903 via a control line 908 and the IG relay 904 via a control line 909 in accordance with the detected operation. For example, when detecting the ACC ON operation, the power supply management ECU 901 closes the ACC relay 903 to supply power via the power line 906. Further, when detecting the IG ON operation, the power supply management ECU 901 closes the IG relay 904 to supply power via the power line 907.

The ECU 902 performs an operation in accordance with a combination of whether the +B power of the +B power supply, the ACC power of the ACC power supply, and the IG power of the IG power supply are supplied via the three power lines 905, 906, and 907. For example, when the ACC power of the ACC power supply is supplied, the ECU 902 executes a predetermined operation determined as the operation for an ACC ON state, and when the IG power of the IG power supply is supplied, the ECU 902 executes a predetermined operation determined as the operation for an IG ON state. A communication line 910 connects the power supply management ECU 901 and the ECU 902, and the power supply management ECU 901 and the ECU 902 can communicate with each other. One or two of the +B power supply, the ACC power supply, and the IG power supply may be omitted depending on the specifications of the ECU 902.

As another mode of the operation control of the ECU, a mode has been proposed in which a function called a network management (NM) function is added to the ECU to reduce the number of power lines compared to the mode shown in FIG. 3A. The NM function includes a function that enables control on a bus basis to switch the state of each ECU connected to a communication bus between a standby state in which operation is suppressed and a startup state in which operation can be executed (Japanese Unexamined Patent Application Publication No. 2016-134855 (JP 2016-134855 A)). In the example illustrated in FIG. 3B, an ECU 912 includes an NM unit 913 that has the NM function, and power from the power supply 900 is supplied to the ECU 912 only as the +B power of the +B power supply via the power line 905. A power supply management ECU 911 detects a user's operation of turning on the ACC or the IG using a key or a push switch, and instructs the ECU 912 via the communication line 910 in accordance with the detected operation.

In the standby state, the NM unit 913 waits for the above-described instruction from the power supply management ECU 911, and upon receiving the instruction, shifts the ECU 912 to the startup state. This instruction is a message in a format conforming to the specification of the NM function, and the message can include, for example, information such as ACC ON and IG ON. After transitioning to the startup state, the ECU 912 further executes the predetermined operations for the ACC ON state or the IG ON state based on the information included in the instruction. In the startup state of the ECU 912, when the NM unit 913 determines that the ECU 912 may transition to the standby state based on the operation state of the ECU 912 and communication with the power supply management ECU 911 or the like, the NM unit 913 can cause the ECU 912 to transition to the standby state.

In the example shown in FIG. 3B, the number of power lines, relays, or the like can be reduced, and therefore costs can be reduced, as compared with the example shown in FIG. 3A.

SUMMARY

Since the ECU including the NM function consumes standby power even in the standby state in which the ECU does not need to operate, the standby power increases in a network system that includes a large number of ECUs.

The disclosure provides an in-vehicle network system in which standby power is suppressed.

The in-vehicle network system according to a first aspect of the disclosure includes a power supply, an upper ECU, an intermediate ECU configured to communicate with the upper ECU, and a plurality of lower ECUs configured to communicate with the intermediate ECU. The intermediate ECU is configured to receive power supplied from the power supply, and maintain the lower ECUs in a power-off state until the intermediate ECU receives a message from the upper ECU and supply the power supplied from the power supply to the lower ECUs in response to the message transmitted from the upper ECU. The lower ECUs are configured to transition, when the power is supplied from the power supply, from the power-off state to a standby state to wait for an instruction.

According to the first aspect of the disclosure, the intermediate ECU may be further configured to transmit a message to the lower ECUs in the standby state in response to the message transmitted from the upper ECU. The lower ECUs may be configured to transition from the standby state to a startup state in response to the message transmitted from the intermediate ECU.

According to the first aspect of the disclosure, the lower ECUs may be configured to specify an operation in the startup state in response to the message transmitted from the intermediate ECU.

According to the disclosure, the ECU is set to the power-off state instead of the standby state in which the standby power is consumed, so that it is possible to provide an in-vehicle network system in which the standby power is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A network system according to the disclosure employs an NM function to reduce the number of power lines or the like. In the network system, an ECU that does not need to be currently started is set to a power-off state in which no power is consumed, instead of a standby state of the NM function in which standby power is consumed, and when the need for starting the ECU occurs, power is supplied to set a startup state after the standby state. Thereby, the standby power of the network system can be suppressed.

Embodiment

Figure 1:
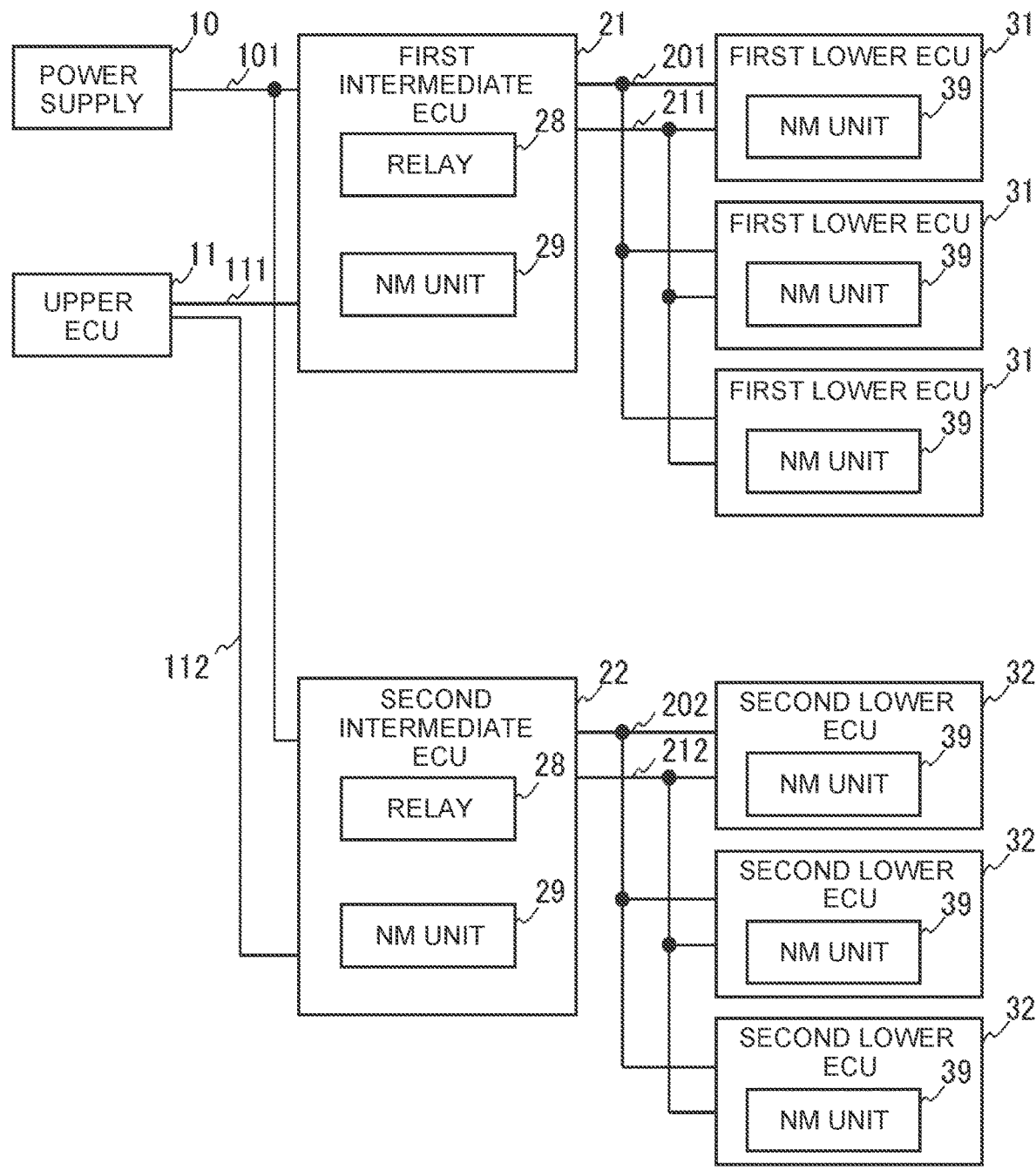
FIG. 1 is a diagram showing a configuration of a network system according to an embodiment of the disclosure.

Hereinafter, an embodiment of the disclosure will be described in detail with reference to the drawings.
Configuration FIG. 1 is a diagram showing a configuration of a network system 1 according to the embodiment.

The network system 1 includes a tree-type connection topology. FIG. 1 shows a configuration in which two intermediate nodes are subordinate to one upper node, and three lower nodes are subordinate to each of the intermediate nodes. In FIG. 1, an upper ECU 11 is the upper node. A first intermediate ECU 21 and a second intermediate ECU 22 are the intermediate nodes. First lower ECUs 31 are the lower nodes subordinate to the first intermediate ECU 21, and second lower ECUs 32 are the lower nodes subordinate to the second intermediate ECU 22. The network system 1 is mounted on a vehicle and includes the ECUs described above and a power supply 10 that supplies power to the ECUs. In the following description, as the intermediate nodes, two ECUs, namely, the first intermediate ECU 21 and the second intermediate ECU 22, are provided. However, the number of the intermediate nodes and the number of the lower nodes subordinate to each of the intermediate nodes are not specifically limited. That is, two ECUs are provided as the intermediate nodes in this embodiment, but an ECU may be provided as the intermediate node, and three or more ECUs may be provided as the intermediate node. Furthermore, three ECUs are provided as the lower nodes subordinate to each of the intermediate nodes in this embodiment, but two or less ECUs may be provided as the lower nodes, and four or more ECUs may be provided as the lower nodes.

As an example, the upper ECU 11 is a relatively highly functional ECU that collectively performs computations for various vehicle control functions. The lower ECUs such as the first lower ECUs 31 and the second lower ECUs 32 are, for example, ECUs provided in each component of the vehicle and having relatively specialized functions for individually controlling each sensor or each actuator. The intermediate ECUs such as the first intermediate ECU 21 and the second intermediate ECU 22 are ECUs that function as gateways that relay communication between the upper ECU 11 and the lower ECUs. The first intermediate ECU 21 relays communication between the upper ECU 11 and the first lower ECUs 31. The second intermediate ECU 22 relays communication between the upper ECU 11 and the second lower ECUs 32. These ECUs are typically configured to include a control unit such as a processor or a microcomputer and a memory.

The upper ECU 11 and the first intermediate ECU 21 are connected by a communication line 111. The first intermediate ECU 21 and the first lower ECUs 31 are connected by a communication line (bus) 211. The upper ECU 11 and the second intermediate ECU 22 are connected by a communication line 112. The second intermediate ECU 22 and the second lower ECUs 32 are connected by a communication line (bus) 212. Communication between the upper ECU 11 and the first intermediate ECU 21 and communication between the upper ECU 11 and the second intermediate ECU 22 are performed in accordance with, for example, the Ethernet (registered trademark) standard. However, the communication standard is not limited thereto. Communication between the first intermediate ECU 21 and the first lower ECUs 31 and communication between the second intermediate ECU 22 and the second lower ECUs 32 are performed in accordance with, for example, the controller area network (CAN; registered trademark) standard. However, the communication standard is not limited thereto.

The power supply 10 is connected to the first intermediate ECU 21 and the second intermediate ECU 22 by a power line 101. The first intermediate ECU 21 and the first lower ECUs 31 are connected by a power line 201. Further, the second intermediate ECU 22 and the second lower ECUs 32 are connected by a power line 202. Each of the first intermediate ECU 21 and the second intermediate ECU 22 includes a relay 28. The relay 28 of the first intermediate ECU 21 can switch between a disconnected state and a connected state of the power line 101 and the power line 201. The relay 28 of the second intermediate ECU 22 can switch between a disconnected state and a connected state of the power line 101 and the power line 202. Although not shown, the power supply 10 and the upper ECU 11 may be connected by the power line 101, or may be connected by another power line provided separately from the power lines described above.

Each of the first intermediate ECU 21 and the second intermediate ECU 22 includes an NM unit 29. Each of the first lower ECUs 31 and the second lower ECUs 32 includes an NM unit 39. The NM units 29 and 39 have the network management (NM) function described above, and perform control to switch the state of each ECU between the standby state in which operation is suppressed and the startup state in which various operations can be executed.

The upper ECU 11 collects, for example, information on the vehicle and surrounding conditions of the vehicle from the first lower ECUs 31 and the second lower ECUs 32 that control the sensors. This information may include, for example, operational conditions of the actuators, etc., driving conditions of the vehicle such as vehicle speed and acceleration, environmental conditions of the vehicle such as roads and objects surrounding the vehicle, a seating status of an occupant, and details of operations performed with respect to each component of the vehicle. The upper ECU 11 performs computations based on this information and generates control data. The control data is data for controlling various functions of the vehicle, such as an autonomous driving function, a self-parking function, drive assistance functions including collision avoidance, lane keeping, automatic follow-up of the preceding vehicle, and cruise control, operational control of an engine, a transmission, a cooling device, and an air conditioner, charging and discharging control of a battery, lighting of headlamps in accordance with illuminance, permission of unlocking doors based on authentication using a mobile device (electronic key), and presentation of information to a user. The upper ECU 11 transmits the control data as appropriate to the first lower ECUs 31 and the second lower ECUs 32 that control the actuators to cause the actuators to operate in accordance with the control data. In the network system 1, cost is reduced by concentrating various control functions of the vehicle in the upper ECU 11 and relatively simplifying the configurations of the first lower ECUs 31 and the second lower ECUs 32 instead.

Processes

Figure 2:
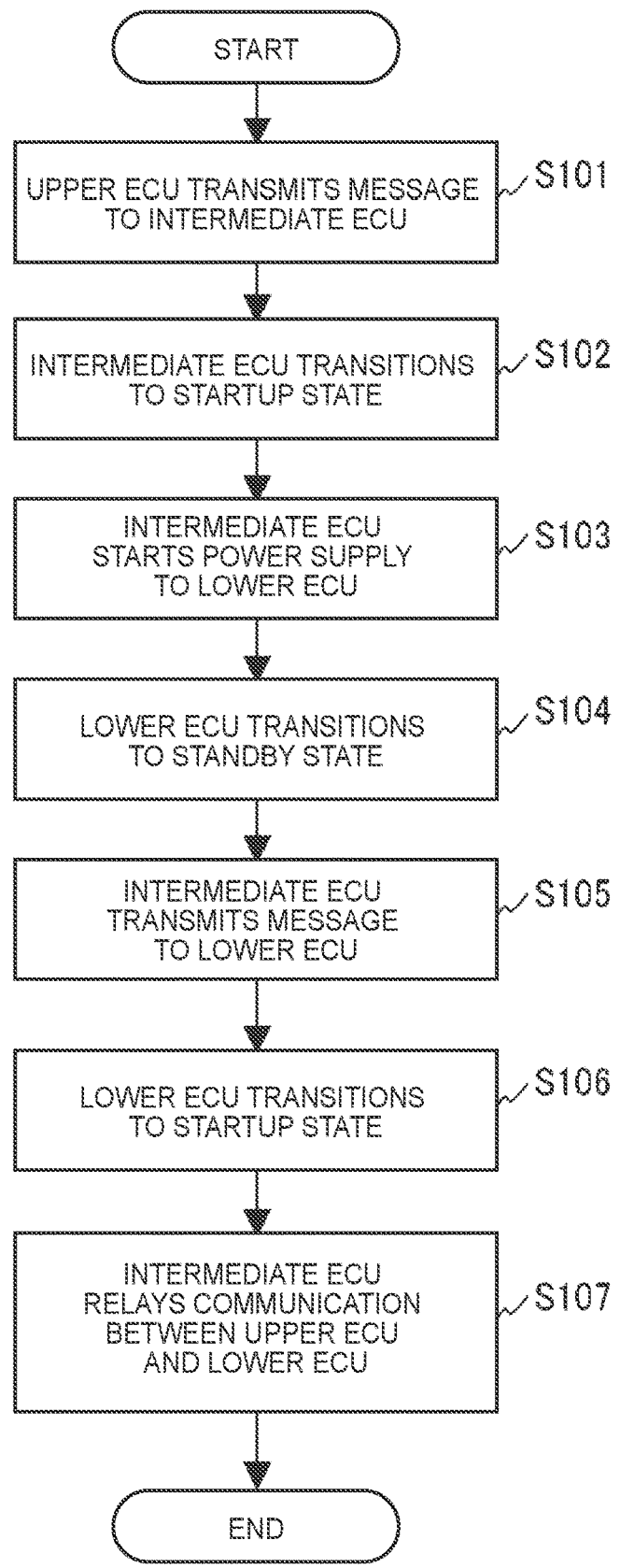
FIG. 2 is a flowchart showing a startup process in the network system according to the embodiment of the disclosure.
Figure 3A:
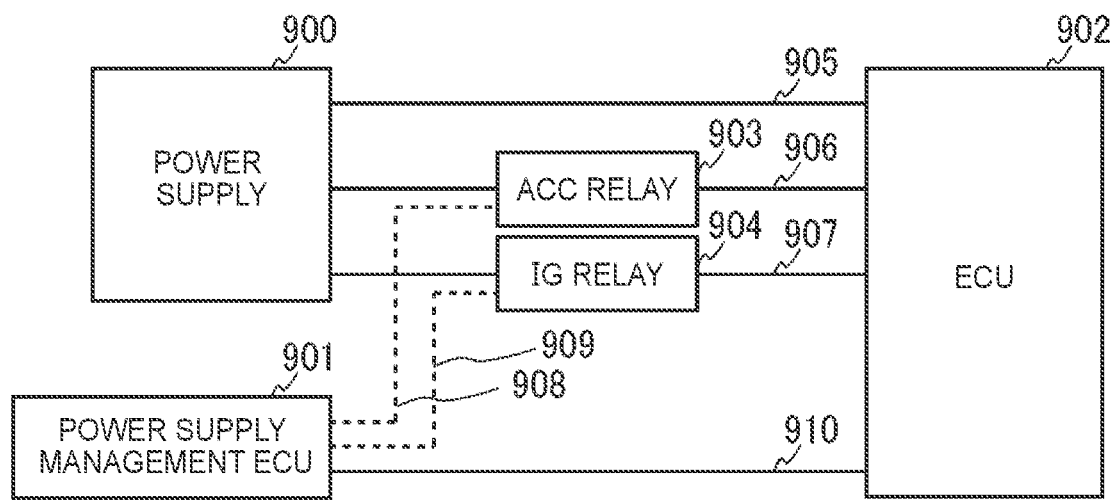
FIG. 3A is a diagram showing power supply control of an ECU according to the related art.
Figure 3B:
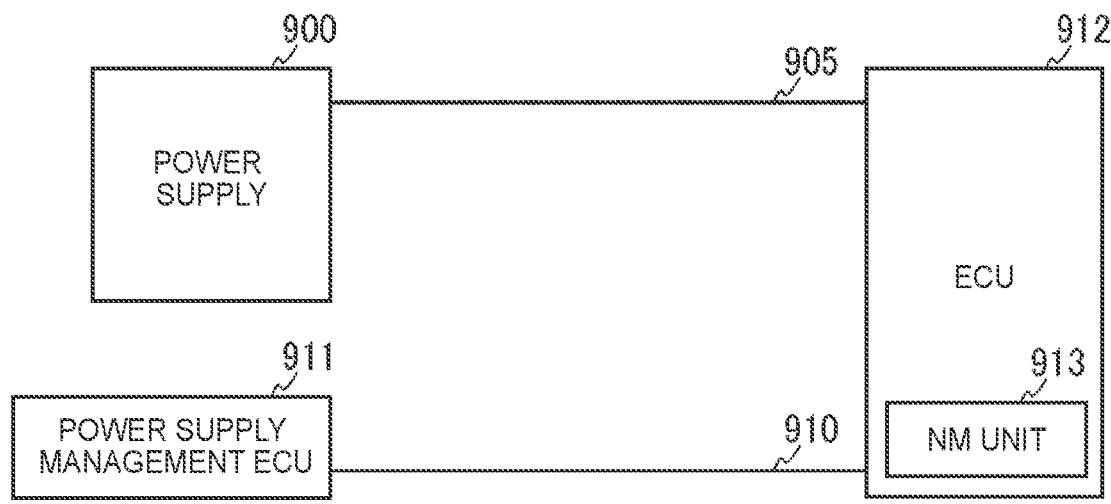
FIG. 3B is another diagram showing power supply control of an ECU according to the related art.

A startup process of the network system 1 according to the embodiment will be described below. FIG. 2 is a flowchart showing the startup process. As an example, a description will be given with reference to FIG. 2 of a process in which, of the lower nodes, the three first lower ECUs 31 subordinate to the first intermediate ECU 21 are started as one target startup group. At the start of this process, the first intermediate ECU 21 is in the standby state as an initial state. The relay 28 of the first intermediate ECU 21 is opened such that the power line 101 and the power line 201 are not connected, and the first lower ECUs 31 are in a power-off state.

Step S101

When determining that it is necessary to start the first lower ECUs 31, the upper ECU 11 transmits a message to the first intermediate ECU 21 via the communication line 111.

The upper ECU 11 can determine whether it is necessary to start the first lower ECUs 31 and what operation is to be performed by the first lower ECUs 31 when the first lower ECUs 31 are started, based on, for example, information received from another ECU that has already been started. A specific method of such determination is determined in accordance with operation specifications of the first lower ECUs 31, operation requirements of the entire vehicle, or the like. For example, when the upper ECU 11 receives, from the ECU that controls a push switch, information indicating that the user has pressed the push switch to perform an operation of instructing the power supply of the vehicle to switch from the OFF state to the IG ON state, the upper ECU 11 can determine that it is necessary to cause the first lower ECUs 31 to perform the operation for the IG ON state. The message includes an instruction to cause the subordinate nodes to transition to the startup state, and information used to specify the operation of the first lower ECUs 31 such as IG ON. The operation of the first lower ECUs 31 is not defined by only the conventional power supply state such as ACC ON and IG ON, but can be variously defined in accordance with advanced functions of the vehicle and the ECU.

Step S102

The first intermediate ECU 21 receives the message. The NM unit 29 causes the first intermediate ECU 21 to transition from the standby state to the startup state in accordance with the instruction in the message to transition to the startup state.

Step S103

The first intermediate ECU 21 closes the relay 28 to connect the power line 101 and the power line 201, and starts power supply from the power supply 10 to the first lower ECUs 31 via the first intermediate ECU 21.

Step S104

When power is supplied to the first lower ECUs 31, the NM units 39 cause the first lower ECUs 31 to transition to the standby state as the initial state.

Step S105

The first intermediate ECU 21 converts a format of the message transmitted from the upper ECU 11 as appropriate in accordance with a difference in the communication standard, and relays the message to the first lower ECUs 31 in the standby state. Note that the first intermediate ECU 21 can appropriately detect that the first lower ECUs 31 have transitioned to the standby state, for example, through communication with the first lower ECU 31s.

Step S106

The first lower ECUs 31 receive the message. The NM units 39 cause the first lower ECUs 31 to transition from the standby state to the startup state in accordance with the instruction in the message to transition to the startup state. The first lower ECUs 31 specify and execute the operation based on the information included in the message and specifying the operation such as IG ON.

Step S107

Communication for controlling various functions of the vehicle is started. The first intermediate ECU 21 relays communication between the upper ECU 11 and the first lower ECUs 31. The first lower ECUs 31 also communicate with each other. Thus, the startup process of the first lower ECU 31s ends. After that, when the upper ECU 11 determines that the first lower ECUs 31 do not need to be operated, for example, by detecting that the user has performed an operation such as IG OFF, the upper ECU 11 causes the first lower ECUs 31 to transition to the standby state, causes the relay 28 of the first intermediate ECU 21 to open to stop power supply, and causes the first intermediate ECU 21 to transition to the standby state, conforming to the NM function.

In the above description, the instruction to cause the first intermediate ECU 21 and the first lower ECUs 31 to transition to the startup state and the information used to specify the operation of the first lower ECUs 31 such as IG ON are included in the same message. However, the above configuration is not limited as long as a similar startup process can be executed. For example, these instructions and information may be individually included in two messages separately transmitted from the upper ECU 11.

Modification

In the network system 1 described above, the upper ECU 11 and the first intermediate ECU 21 are connected by the communication line 111, and the upper ECU 11 and the second intermediate ECU 22 are connected by the communication line 112 that is different from the communication line 111. That is, the upper node and each intermediate node are not connected by a one-to-many bus connection, but are connected by a one-to-one connection with a dedicated line. This is because, in order for the upper node to communicate with many lower nodes connected by each intermediate node without interruption, providing a dedicated line between the upper node and the intermediate node can facilitate a design that guarantees a sufficient band rather than bus connection. However, as a modification, a mode in which the upper node and each intermediate node are connected by a one-to-many bus connection may be adopted. In this case, a part of the process described above is changed. The changes to be made will be described below.

In the mode in which the upper ECU 11 is connected to the first intermediate ECU 21 and the second intermediate ECU 22 by a bus, the messages transmitted from the upper ECU 11 to the first intermediate ECU 21 include a message for starting the first lower ECUs 31 subordinate to the first intermediate ECU 21 and a message for starting the second lower ECUs 32 subordinate to the second intermediate ECU 22. In step S102, the first intermediate ECU 21 transitions from the standby state to the startup state in accordance with the standard of the NM function, regardless of the message received.

In step S102, the first intermediate ECU 21 that has transitioned to the startup state determines whether it is necessary to start the subordinate first lower ECUs 31 based on the received message. This determination can be made when the upper ECU 11 transmits the message including information necessary for the determination, and the first intermediate ECU 21 refers to this information. This information may be information such as the IG ON described above, or may be information that more specifically specifies the first lower ECUs 31.

When the first intermediate ECU 21 determines that the first lower ECUs 31 need to be started, the process proceeds to step 5103. When the first intermediate ECU 21 determines that the first lower ECUs 31 do not need to be started, the first intermediate ECU 21 waits to receive the next message from the upper ECU 11. Thereafter, when the first intermediate ECU 21 determines that the first lower ECUs 31 need to be started based on the next message received, the process proceeds to step 5103, and when the first intermediate ECU 21 determines that the first lower ECUs 31 do not need to be started based on the next message received, the first intermediate ECU 21 repeats the process of waiting to receive the next message.

In the embodiment and modification, the process when the first lower ECUs 31 subordinate to the first intermediate ECU 21 are started has been described as an example. A similar process may be performed when the second lower ECUs 32 subordinate to the second intermediate ECU 22 are started.

Effect

The network system 1 according to the embodiment and the modification employs the NM function to reduce the number of power lines or the like, and the lower ECUs that do not need to be currently started are set to the power-off state in which no power is consumed, instead of the standby state of the NM function in which the standby power is consumed. When the need for starting the lower ECUs occurs, power is supplied to set the startup state after the standby state. This suppresses the standby power even when the number of the lower ECUs is large. Also, by grouping the lower ECUs under a plurality of the intermediate ECUs, starting can be instructed in groups, so that only the lower ECUs in the group that need to be started can be started, and the power-off state of the other lower ECUs can be maintained without being started in conjunction with the group started above. Thus, power consumption can be suppressed.

The ECUs do not need to include the NM function, and the lower ECUs may be started when the intermediate ECU starts power supply to the lower ECUs in response to an instruction from the upper ECU. Also in this case, the effect of suppressing power consumption by the startup control in groups described above can be obtained.

The disclosure is not limited to the network system, and can be implemented as a method of controlling the network system, a control program for the network system to be performed by the ECU having a processor and a memory and a computer-readable non-transitory storage medium that stores the control program, and a vehicle equipped with the network system, etc. In addition, the disclosure can be applied to network systems other than the network system mounted on the vehicle.

The disclosure is advantageous for a network system mounted on a vehicle or the like.

What is claimed is:

1. An in-vehicle network system comprising:
a power supply;
an upper electronic control unit;
an intermediate electronic control unit configured to communicate with the upper electronic control unit; and
a plurality of lower electronic control units configured to communicate with the intermediate electronic control unit,
wherein:
the intermediate electronic control unit is configured to:
receive power supplied from the power supply, and
supply the power supplied from the power supply to the lower electronic control units;
the lower electronic control units are configured to transition, when the power is supplied from the intermediate electronic control unit, from a power-off state to a standby state to wait for an instruction; and
the power supply is connected to the intermediate electronic control unit via a power line and is not connected via the same power line to the upper electronic control unit.

2. The in-vehicle network system according to claim 1, wherein:
the intermediate electronic control unit is configured to transmit an instruction to the lower electronic control units in the standby state in response to an instruction transmitted from the upper electronic control unit; and
the lower electronic control units are configured to transition from the standby state to a startup state in response to the instruction transmitted from the intermediate electronic control unit.

3. The in-vehicle network system according to claim 1, wherein
the intermediate electronic control unit is in a standby state in which the power line is open, until receiving an instruction from the upper electronic control unit.

4. The in-vehicle network system according to claim 3, wherein
when intermediate electronic control unit is in the standby state, the lower electronic control units are in the power-off state.

5. The in-vehicle network system according to claim 1, wherein:
the intermediate electronic control unit is connected to the power supply via the power line, and is connected to the lower electronic control units via another power line; and
the intermediate electronic control unit is in a standby state in which both the power line and the another power line are open, until receiving an instruction from the upper electronic control unit.

6. The in-vehicle network system according to claim 4, wherein
when intermediate electronic control unit is in the standby state, the lower electronic control units are in the power-off state.

7. The in-vehicle network system according to claim 4, wherein:
while the intermediate electronic control unit is in the standby state and the lower electronic control units are in the power-off state, the upper electronic control unit determines that it is necessary to start at least one of the lower electronic control units, and
upon determining that it is necessary to start at least one of the lower electronic control units, transmits an instruction to the intermediate electronic control unit, so that the intermediate electronic control unit transitions from the standby state to a startup state in which both the power line and the another power line are closed; and
the intermediate electronic control unit
converts the instruction transmitted from the upper electronic control unit into a format compatible with the at least one of the lower electronic control units, and
transmits the converted instruction to the at least one of the lower electronic control units, so that the at least one of the lower electronic control units transitions from the power-off state to the standby state.

8. The in-vehicle network system according to claim 7, wherein
the lower electronic control units are configured to specify an operation to be performed based on the converted instruction transmitted from the intermediate electronic control unit.

9. The in-vehicle network system according to claim 1, wherein:
there are a plurality of the intermediate electronic control unit including a first intermediate electronic control unit and a second intermediate electronic control unit,
the power supply is connected to the first intermediate electronic control unit and the second intermediate electronic control unit via the same power line,
the first intermediate electronic control unit relays communication between the upper electronic control unit and a first group of the lower electronic control units, and
the second intermediate electronic control unit relays communication between the upper electronic control unit and a second group, separate from the first group, of the lower electronic control units.

10. A method for communication in an in-vehicle network system including a power supply, an upper electronic control unit, an intermediate electronic control unit configured to communicate with the upper electronic control unit, and a plurality of lower electronic control units configured to communicate with the intermediate electronic control unit, the method comprising:
receiving, by the intermediate electronic control unit, power supplied from the power supply;
supplying, by the intermediate electronic control unit, the power supplied from the power supply to the lower electronic control units; and
when the power is supplied from the intermediate electronic control unit, transitioning, by the lower electronic control units, from a power-off state to a standby state to wait for an instruction,
wherein the power supply is connected to the intermediate electronic control unit via a power line and is not connected via the same power line to the upper electronic control unit.

11. A non-transitory computer readable medium storing an instruction for one or more processors in an in-vehicle network system, the in-vehicle network system including a power supply, an upper electronic control unit, an intermediate electronic control unit configured to communicate with the upper electronic control unit, and a plurality of lower electronic control units configured to communicate with the intermediate electronic control unit, the instruction, when executed, causing the one or more processors in the in-vehicle network system to perform:
receiving, by the intermediate electronic control unit, power supplied from the power supply;
supplying, by the intermediate electronic control unit, the power supplied from the power supply to the lower electronic control units; and
when the power is supplied from the intermediate electronic control unit, transitioning, by the lower electronic control units, from a power-off state to a standby state to wait for an instruction,
wherein the power supply is connected to the intermediate electronic control unit via a power line and is not connected via the same power line to the upper electronic control unit.

12. The method according to claim 10, further comprising:
transmitting, by the intermediate electronic control unit, an instruction to the lower electronic control units in the standby state in response to an instruction transmitted from the upper electronic control unit; and
transitioning, by the lower electronic control units, from the standby state to a startup state in response to the instruction transmitted from the intermediate electronic control unit.

13. The method according to claim 10, wherein
the intermediate electronic control unit is in a standby state in which the power line is open, until receiving an instruction from the upper electronic control unit.

14. The method according to claim 10, wherein:
the intermediate electronic control unit is connected to the power supply via the power line, and is connected to the lower electronic control units via another power line; and
the intermediate electronic control unit is in a standby state in which both the power line and the another power line are open, until receiving an instruction from the upper electronic control unit.

15. The non-transitory computer readable medium according to claim 11, wherein the instruction, when executed, causes the one or more processors in the in-vehicle network system to further perform:
transmitting, by the intermediate electronic control unit, an instruction to the lower electronic control units in the standby state in response to an instruction transmitted from the upper electronic control unit; and
transitioning, by the lower electronic control units, from the standby state to a startup state in response to the instruction transmitted from the intermediate electronic control unit.

16. The non-transitory computer readable medium according to claim 11, wherein
the intermediate electronic control unit is in a standby state in which the power line is open, until receiving an instruction from the upper electronic control unit.

17. The non-transitory computer readable medium according to claim 11, wherein:
the intermediate electronic control unit is connected to the power supply via the power line, and is connected to the lower electronic control units via another power line; and the intermediate electronic control unit is in a standby state in which both the power line and the another power line are open, until receiving an instruction from the upper electronic control unit.

* * * * *